(12) United States Patent
Chen et al.

(10) Patent No.: US 7,146,196 B2
(45) Date of Patent: Dec. 5, 2006

(54) METHOD FOR IDENTIFYING DETACHABLE COVER OF A CELLULAR PHONE

(75) Inventors: Kuan-Hua Chen, Taipei (TW); Tzu-Wei Wang, Taipei (TW); Liang-Fang Chen, Tai-Nan (TW)

(73) Assignee: BenQ Corporation, Tao-Yuan Hsien (TW)

( * ) Notice: Subject to any disclaimer, the term of this patent is extended or adjusted under 35 U.S.C. 154(b) by 567 days.

(21) Appl. No.: 10/604,289

(22) Filed: Jul. 8, 2003

(65) Prior Publication Data

US 2005/0009579 A1  Jan. 13, 2005

(51) Int. Cl.
*H04B 1/38* (2006.01)

(52) U.S. Cl. ............... 455/575.1; 455/575.3; 455/575.4; 455/575.6

(58) Field of Classification Search ............. 455/575.1, 455/575.3, 575.4, 575.6, 550.1, 478.8, 90.3
See application file for complete search history.

(56) References Cited

U.S. PATENT DOCUMENTS 6,097,943 A * 8/2000 Nordwall .................... 455/418
2002/0037738 A1 * 3/2002 Wycherley et al. .......... 455/550
2003/0100273 A1 * 5/2003 Pedersen et al. .............. 455/90
2004/0053650 A1 * 3/2004 Roper ..................... 455/575.8
2005/0090280 A1 * 4/2005 Nielsen .................... 455/550.1
2006/0030377 A1 * 2/2006 White et al. ............. 455/575.1

FOREIGN PATENT DOCUMENTS

GB      2355126      * 11/2001

* cited by examiner

*Primary Examiner*—Matthew Anderson
*Assistant Examiner*—Tuan Pham
(74) *Attorney, Agent, or Firm*—Winston Hsu (57) ABSTRACT

A cellular phone includes a housing and a cover detachably installed on the housing, the cover containing an ID module for identifying the cover. The cellular phone also contains a transceiver for controlling operation of the cellular phone, the transceiver containing a detection port for communicating with the ID module of the cover and determining identification of the cover, a memory electrically connected to the transceiver, and a database stored in the memory for providing operation parameters to the transceiver according to the identification of the cover.

17 Claims, 7 Drawing Sheets

_METHOD FOR IDENTIFYING DETACHABLE COVER OF A CELLULAR PHONE_

BACKGROUND OF INVENTION

1. Field of the Invention

The present invention relates to a cellular phone, and more specifically, to a method for identifying a detachable cover of a cellular phone and adjusting parameters of the cellular phone according to the identified cover.

2. Description of the Prior Art

A cellular phone cover is a crucial item in the design of a cellular phone. In addition to aesthetics, the design of the cover also affects durability, ability to withstand damage from electrostatic discharge (ESD), and even wireless performance of the cellular phone. As a result, all of the major producers of cellular phones put a great deal of effort into design of the cellular phone cover.

Furthermore, since consumers prefer to change the appearance of their cellular phones, it is now common to find cellular phones with swappable covers. For example, the Motorola® C330 series of cellular phones has three swappable covers with different shapes and textures that are used to cover the circuitry (such as the transceiver) of the cellular phone. With this setup, users can easily and freely change the cover of the cellular phone without concern for the internal hardware or software of the cellular phone.

Figure 1:
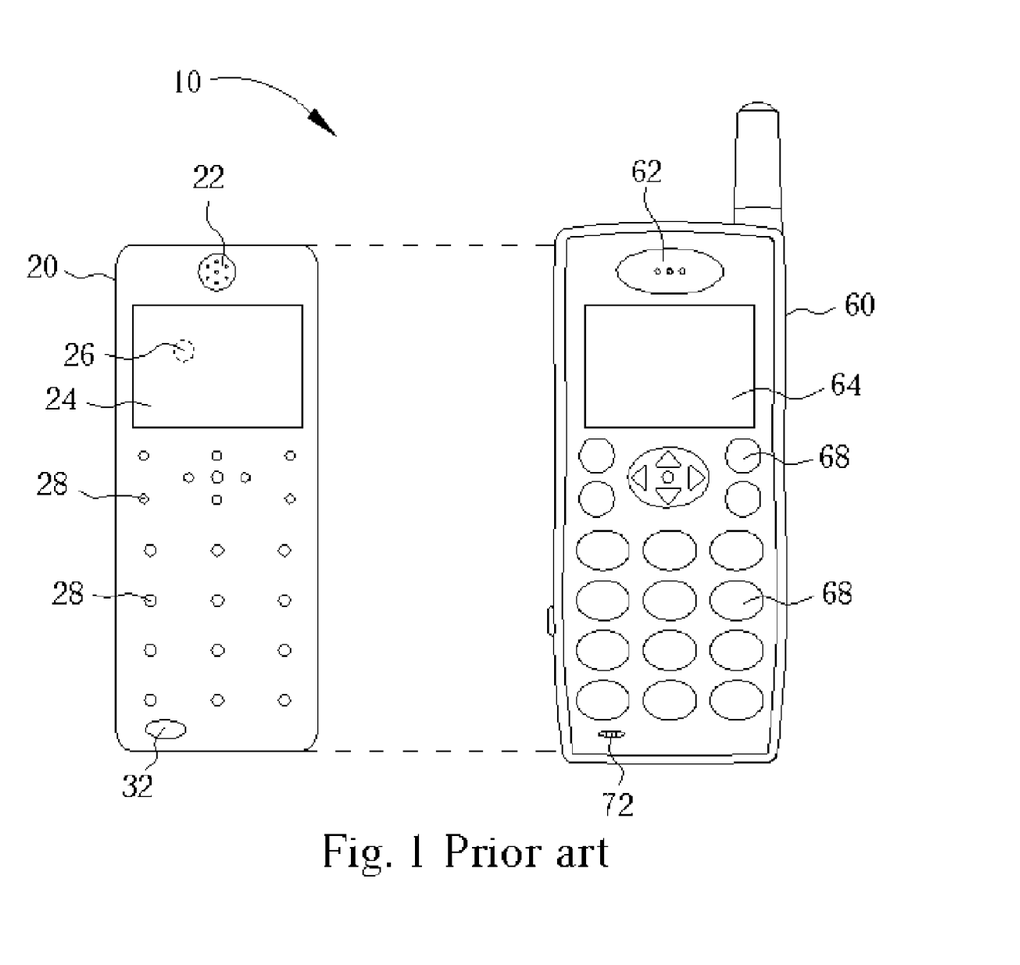
FIG. 1 is a diagram of a cellular phone according to the prior art.

Please refer to FIG. 1. FIG. 1 is a diagram of a cellular phone 10 according to the prior art. The cellular phone 10 contains an internal housing 20 and a cover 60. Formed on the internal housing 20 is a speaker 22, a display 24 such as an LCD display, a backlight Light Emitting Diode (LED) 26, a plurality of keypad sensors 28, and a microphone 32. Each of these items is well known in the art, and will be discussed only to the extent that they apply to the present invention. The cover 60 can be installed on the internal housing 20, and provides protective and aesthetic functions to the cellular phone 10. The cover 60 contains a set of speaker holes 62 for allowing the speaker 22 to be heard through the cover 60 and a display hole 64 for allowing the display 24 to be viewed through the cover 60. A plurality of keys 68 is used for pressing the keypad sensors 28, thereby providing input to the cellular phone 10. The cover 60 also contains a microphone hole 72 for allowing sound signals to travel through the cover 60 to the microphone 32.

Figure 2:
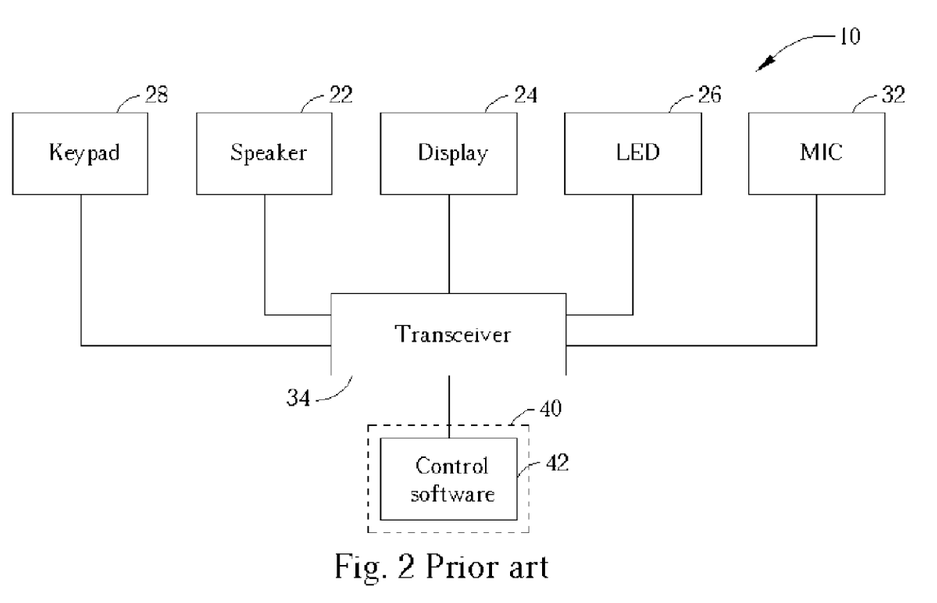
FIG. 2 is a functional block diagram of the cellular phone shown in FIG. 1.

Please refer to FIG. 2. FIG. 2 is a functional block diagram of the cellular phone 10 shown in FIG. 1. A transceiver 34 is used for controlling operation of the cellular phone 10. The transceiver 34 receives instructions from control software 42 stored in a memory 40, and controls hardware operations of the cellular phone 10. For example, the transceiver 34 processes input signals from the keypad sensors 28 and the microphone 32, and sends output signals to the speaker 22, display 24, and backlight LED 26.

The transceiver 34 must be fine-tuned for obtaining optimal performance of the cellular phone 10. Fine-tuning includes providing acoustic and wireless settings to the transceiver 34 to maximize performance. However, every time the cover 60 on the cellular phone 10 is changed, the previously set acoustic and wireless settings may not be suitable for the new cover 60. Therefore, the ability to swap the cover 60 of the cellular phone 10 complicates fine-tuning, and requires designers to find settings for the transceiver 34 that can be used with all of the different covers available. Unfortunately, with so many covers to consider, the acoustic and wireless settings are difficult to fine-tune. Furthermore, even if settings are chosen that can be used adequately with each of the covers, the chosen settings will still not give optimal performance for each of the different covers.

SUMMARY OF INVENTION

It is therefore a primary objective of the claimed invention to provide a cellular phone that can detect the identification of a cellular phone cover in order to solve the above-mentioned problems.

According to the claimed invention, a cellular phone includes a housing and a cover detachably installed on the housing, the cover containing an ID module for identifying the cover. The cellular phone also contains a transceiver for controlling operation of the cellular phone, the transceiver containing a detection port for communicating with the ID module of the cover and determining identification of the cover, a memory electrically connected to the transceiver, and a database stored in the memory for providing operation parameters to the transceiver according to the identification of the cover.

It is an advantage of the claimed invention that the cellular phone is able to detect the identification of the cover and optimize settings of the cellular phone according to the identity of the cover for optimizing performance of the cellular phone for each cover used.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 3:
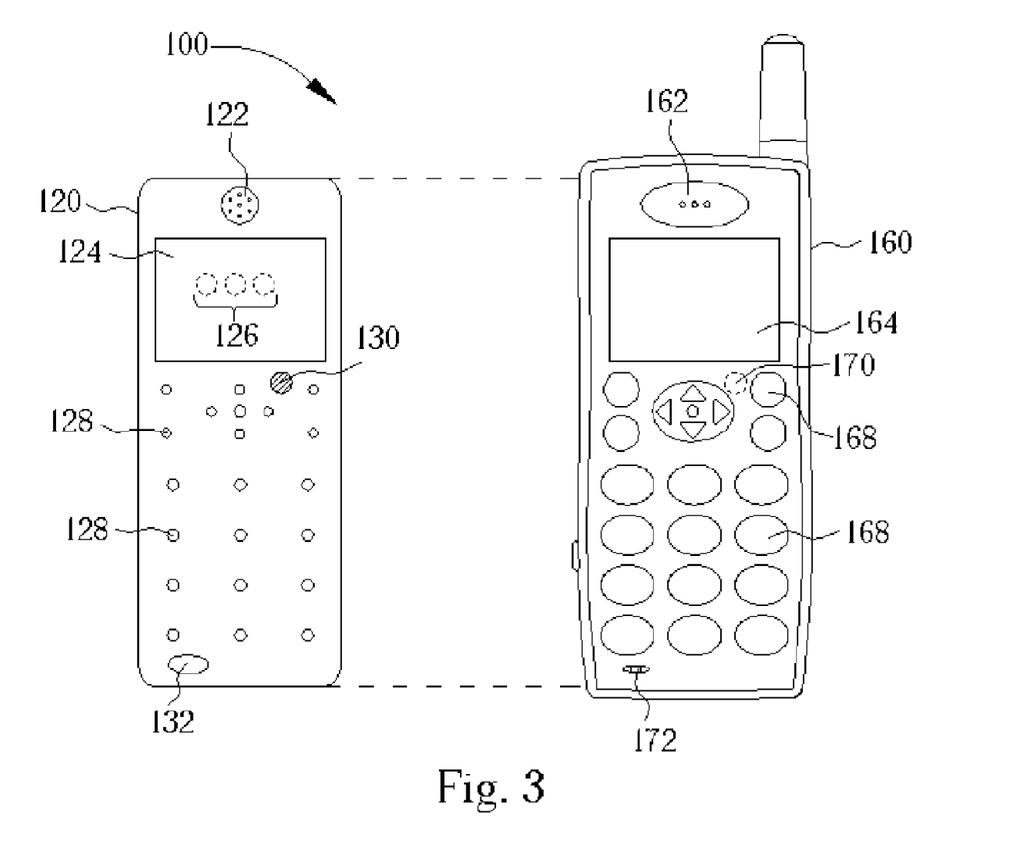
FIG. 3 is a diagram of a cellular phone according to the present invention.

Please refer to FIG. 3. FIG. 3 is a diagram of a cellular phone 100 according to the present invention. Like the cellular phone 10 shown in FIG. 1, the cellular phone 100 has an internal housing 120 and a swappable cover 160. Formed on the internal housing 120 is a speaker 122, a display 124, a backlight LED array 126, a plurality of keypad sensors 128, and a microphone 132. The cover 160 contains a set of speaker holes 162 for allowing the speaker 122 to be heard through the cover 160 and a display hole 164 for allowing the display 124 to be viewed through the cover 160. A plurality of keys 168 is used for pressing the keypad sensors 128, thereby providing input to the cellular phone 100. The cover 160 also contains a microphone hole 172 for allowing sound signals to travel through the cover 160 to the microphone 132.

Differing from the prior art cellular phone 10, the cellular phone 100 of the present invention contains an ID module 170 formed on the cover 160 for identifying the cover 160 and a detection port 130 formed on a transceiver 134 (not shown in FIG. 3) for communicating with the ID module 170 and determining identification of the cover 160.

Figure 4:
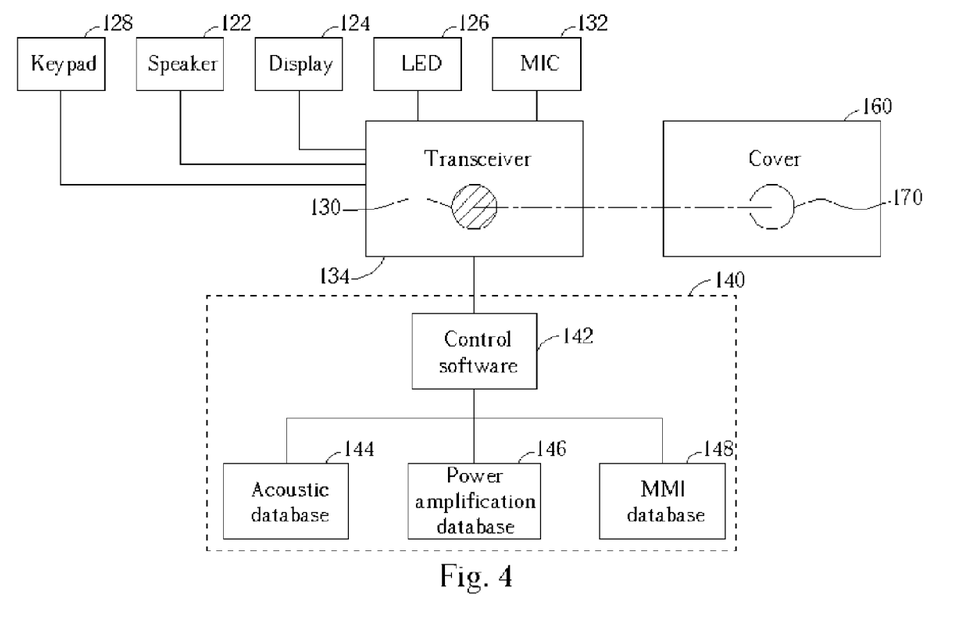
FIG. 4 is a functional block diagram of the cellular phone according to the present invention.

Please refer to FIG. 4, with reference to FIG. 3. FIG. 4 is a functional block diagram of the cellular phone 100 according to the present invention. The transceiver 134 is used for controlling operation of the cellular phone 100. The transceiver 134 receives instructions and data from control software 142 stored in a memory 140, and controls hardware operations of the cellular phone 100. The transceiver 134 processes input signals from the keypad sensors 128 and the microphone 132, and sends output signals to the speaker 122, the display 124, and one or more selected LEDs from the backlight LED array 126.

Every type of cover has its own physical and electrical properties. The geometry design of different covers could influence the radio frequency and acoustic performance of the cellular phone. Besides, depending on the cosmetic design of the cover, a Man-and-Machine interface (MMI) could also have a corresponding change associated with the cover. The present invention offers a method for detecting the identification of the cover 160 and adjusting operating parameters according to the identity of the cover 160. When the cover 160 is placed on the internal housing 120, the detection port 130 of the transceiver 134 makes electrical contact with the ID module 170 of the cover 160. After connection, the detection port 130 reads an identifier stored in the ID module 170, and sends the identity of the cover 160 to the control software 142. The control software 142 then updates parameters and attributes of the cellular phone 100 according to an acoustic database 144, a power amplification database 146, and an MMI database 148 stored in the memory 140. These three databases can also be combined into a single database, but are shown separately for emphasis and clarity.

Once the identity of the cover 160 has been established, operating parameters and attributes can be updated in the cellular phone 100. The control software 142 searches the acoustic database 144 for coefficients corresponding to the identity of the cellular phone 100. The control software 142 locates corresponding Finite Impulse Response (FIR) filter coefficients, and provides the coefficients to the transceiver 134 for improving acoustics of the cellular phone 100. Each type of cover has its own acoustic properties, so identifying the cover provides optimum acoustic effects whenever a new cover is used.

Furthermore, updated voltage compensation coefficients can be provided to the transceiver 134 from the power amplification database 146 for improving power amplification of the cellular phone 100. Changing the voltage compensation coefficients is important because radiated transmission power is different for different covers. Fine-tuning the voltage compensation coefficients allows the cellular phone 100 to maximize its wireless communication capabilities.

In addition to updating technical parameters such as the FIR and voltage compensation coefficients, cosmetic and entertaining attributes can be updated as well. For example, suppose that each type of cover 160 has its own theme. Covers 160 can have themes such as Rock and Roll, Sports, etc. Besides changing the design of the cover 160, the MMI profile can be changed for each type of cover 160 according to contents of the MMI database 148. With each MMI profile a variety of different attributes can be controlled such as key 168 mappings, sets of sounds played through the speaker 122, images to be shown on the display 124, and LEDs from the backlight LED array 126 to be illuminated. Therefore, changing a theme of the cellular phone 100 can be accomplished simply by changing the cover 160.

The contents of the acoustic database 144 and the power amplification database 146 can be calculated in a laboratory while testing the cellular phone 100 with each type of cover 160. Once a collection of covers 160 has been tested, the acoustic database 144 and the power amplification database 146 can be stored in the memory 140. Likewise, once MMI attributes have been created for a collection of covers 160, the MMI database 148 can be stored in the memory 140. The memory 140 is preferably rewritable non-volatile memory such as flash memory for easily updating the contents of the databases 144, 146, 148 along with the control software 142.

Figure 5:
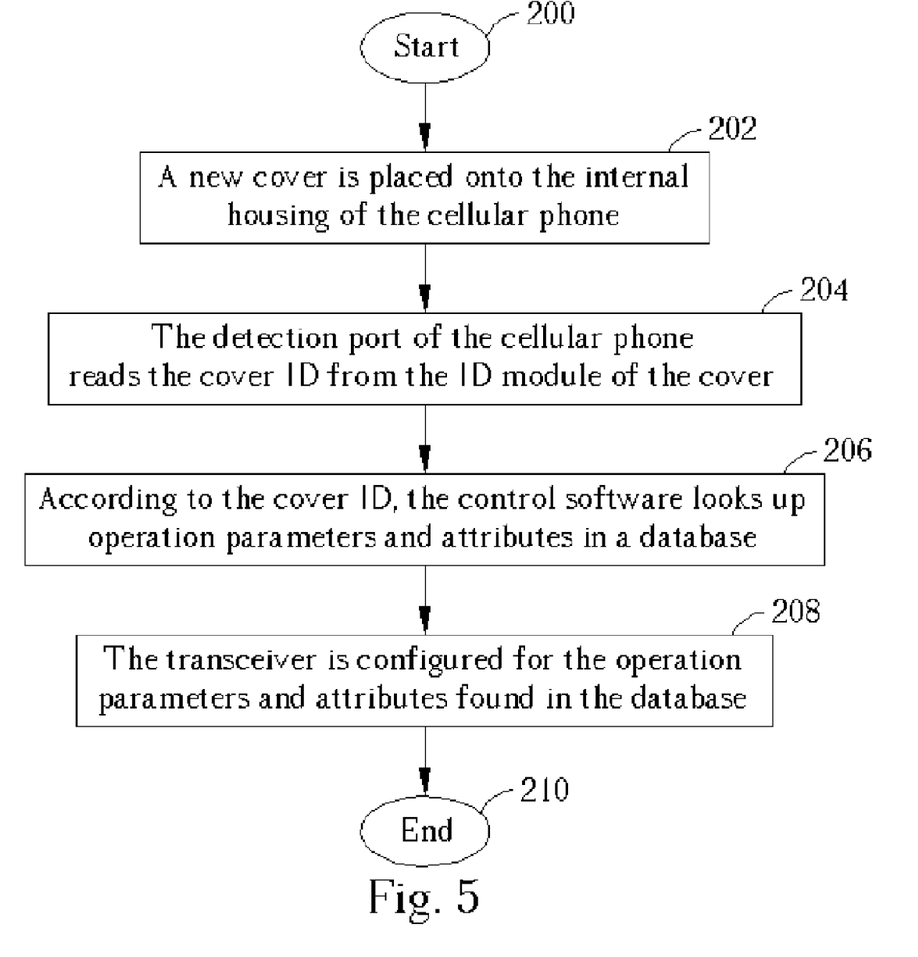
FIG. 5 is a flowchart illustrating the present invention method of identifying a cover and updating parameters and attributes of the cellular phone according to the identity of the cover.

Please refer to FIG. 5. FIG. 5 is a flowchart illustrating the present invention method of identifying the cover 160 and updating parameters and attributes of the cellular phone 100 according to the identity of the cover 160. Steps contained in the flowchart will be explained below.

Step 200: Start;

Step 202: A new cover 160 is placed onto the internal housing 120 of the cellular phone 100 and the ID module 170 on the cover makes electrical contact with the detection port 130 of the transceiver 134;

Step 204: The detection port 130 of the cellular phone 100 reads the identity of cover 160 from the ID module 170;

Step 206: According to the identity of the cover 160, the control software 142 looks up FIR coefficients from the acoustic database 144, voltage compensation coefficients from the power amplification database 146, and MMI attributes from the MMI database 148;

Step 208: The transceiver 134 is configured with the parameters and attributes corresponding to the identity of the cover 160; and Step 210: End.

Figure 6:
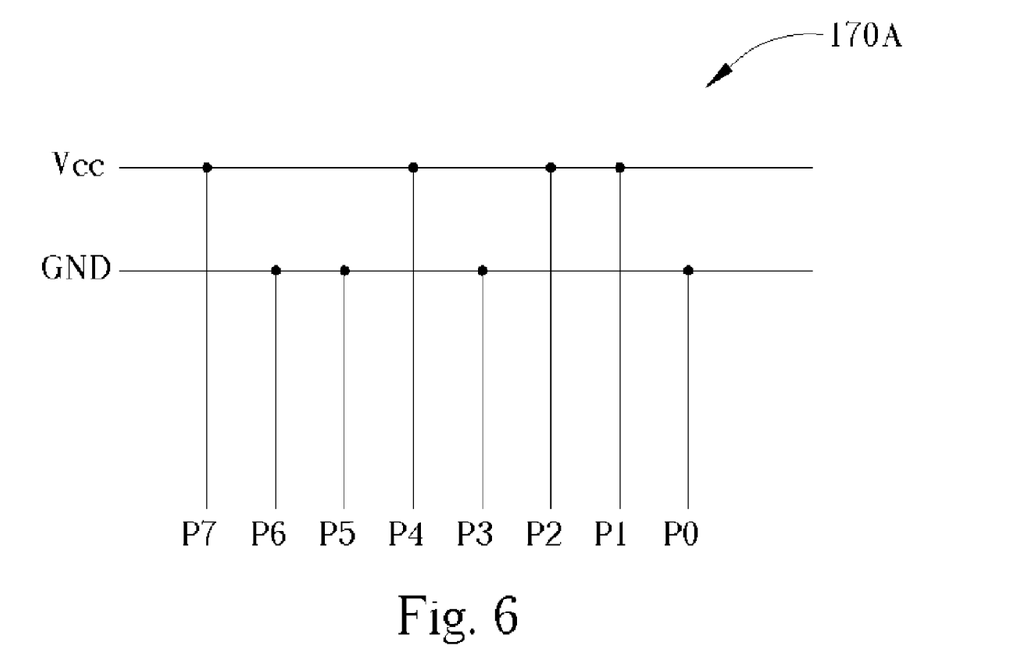
FIG. 6 illustrates a first embodiment ID module used to identify the cover.

The present invention uses the detection port 130 to read the identity of the cover 160 from the ID module 170. Please refer to FIG. 6. FIG. 6 illustrates a first embodiment ID module 170A used to identify the cover 160. The ID module 170A contains a parallel set of pins P0–P7 that are used for giving an 8-bit identity to the ID module 170A. Each of the pins can be directly connected to a voltage source Vcc or ground GND for setting a value of each bit to "1" or "0", respectively. In the example shown in FIG. 6, assume pin P7 represents the most significant bit and pin P0 represents the least significant bit of the identity. Therefore, the identity stored in the ID module 170A would be "10010110". The detection port 130 reads the set of pins P0–P7 in parallel for quickly detecting the identity of the cover 160.

Figure 7:
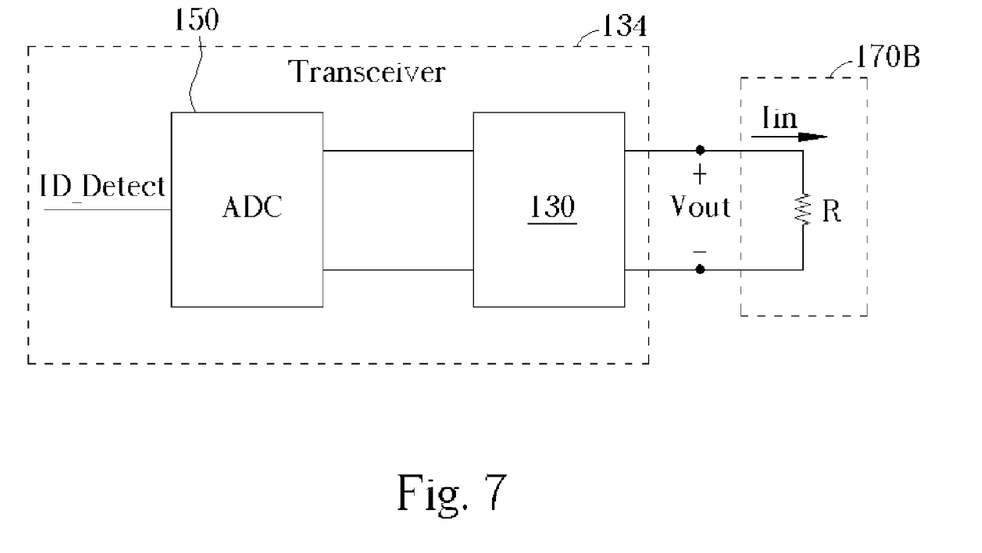
FIG. 7 illustrates a second embodiment ID module used to identify the cover.

Please refer to FIG. 7. FIG. 7 illustrates a second embodiment ID module 170B used to identify the cover 160. The ID module 170B contains a resistor R with a precisely measured resistance. To measure the resistance of resistor R, the detection port 130 of the transceiver 134 sends a current Iin through the resistor R, generating an output voltage Vout. The detection port 130 then sends this output voltage Vout to an analog to digital converter (ADC) 150. Based on the value of the output voltage Vout, the ADC 150 outputs a digital value ID_Detect as the identity of the cover 160.

Please keep in mind that the embodiments of the ID module 170A and 170B shown in FIG. 6 and FIG. 7 are used as an example only, and any structure can be used for the ID module 170 provided that the detection port 130 of the transceiver 134 is able to accurately read the identity stored in the ID module 170. In addition to the parallel interface shown in FIG. 6, a one wire serial interface could also be used. In this case, the identity of the cover 160 could be burned into the ID module 170, and the transceiver 134 could read the identity through the detection port 130 one bit at a time.

The present invention is not limited to updating coefficients and attributes for acoustics, voltage compensation, and MMI. Other parameters that vary depending on the type of cover used on a cellular phone are also included in the scope of the present invention. Additional databases can be added, or additional fields could be added to a single database for storing other types of parameters.

In contrast to the prior art cellular phone, the cellular phone of the present invention is capable of identifying a detachable cover of a cellular phone and adjusting parameters of the cellular phone according to the identified cover for optimizing performance of the cellular phone and for easily changing a theme of the cellular phone.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A cellular phone comprising:
   a housing;
   a cover detachably installed on the housing, the cover containing an ID module for identifying the cover;
   a transceiver for controlling operation of the cellular phone, the transceiver containing a detection port for communicating with the ID module of the cover and determining identification of the cover;
   a memory electrically connected to the transceiver; and
   a database stored in the memory for providing operation parameters to the transceiver according to the identification of the cover,
   wherein the database includes a power amplification database for providing voltage compensation coefficients to the transceiver for improving power amplification of the cellular phone.

2. The cellular phone of claim 1 wherein the database includes an acoustic database, the acoustic database providing Finite Impulse Response (FIR) filter coefficients to the transceiver for improving acoustics of the cellular phone.

3. The cellular phone of claim 1 wherein the database includes a Man-Machine Interface (MMI) database, the MMI database providing user interface attributes to the transceiver according to the identification of the cover.

4. The cellular phone of claim 3 wherein the MMI database contains a keypad-mapping configuration corresponding to each cover.

5. The cellular phone of claim 3 wherein the MMI database contains a set of sound files corresponding to each cover.

6. The cellular phone of claim 3 wherein the MMI database contains a set of graphical images corresponding to each cover.

7. The cellular phone of claim 3 wherein the MMI database contains a Light Emitting Diode (LED) configuration corresponding to each cover.

8. The cellular phone of claim 1 wherein the ID module of the cover contains a unique resistance value for identifying the cover, and the transceiver measures the resistance for determining the identification of the cover.

9. The cellular phone of claim 1 wherein the detection port of the transceiver is capable of communicating with the ID module of the cover in parallel for determining the identification of the cover.

10. A method of identifying a detachable cover of a cellular phone, the cellular phone comprising a housing, the method comprising:
    providing an ID module on the cover for identifying the cover;
    providing a transceiver for controlling operation of the cellular phone, the transceiver containing a detection port for communicating with the ID module of the cover and determining identification of the cover;
    identifying the cover with the detection port;
    storing a database in memory, the database containing multiple sets of operation parameters corresponding to different covers of the cellular phone, wherein the database includes a power amplification database;
    searching the database to locate a set of operation parameters corresponding to the identified cover and searching the power amplification database for providing voltage compensation coefficients to the transceiver for improving power amplification of the cellular phone; and
    operating the cellular phone with the located set of operation parameters.

11. The method of claim 10 wherein the database includes an acoustic database, and the method further comprises searching the acoustic database for providing Finite Impulse Response (FIR) filter coefficients to the transceiver for improving acoustics of the cellular phone.

12. The method of claim 10 wherein the database includes a Man-Machine Interface (MMI) database, and the method further comprises searching the MMI database for providing user interface attributes to the transceiver according to the identification of the cover.

13. The method of claim 12 wherein the MMI database contains a keypad-mapping configuration corresponding to each cover.

14. The method of claim 12 wherein the MMI database contains a set of sound files corresponding to each cover.

15. The method of claim 12 wherein the MMI database contains a set of graphical images and a Light Emitting Diode (LED) configuration corresponding to each cover.

16. The method of claim 10 wherein the ID module of the cover contains a unique resistance value for identifying the cover, and the transceiver measures the resistance for determining the identification of the cover.

17. The method of claim 10 wherein the detection port of the transceiver is capable of communicating with the ID module of the cover in parallel for determining the identification of the cover.

* * * * *